Figure 1:
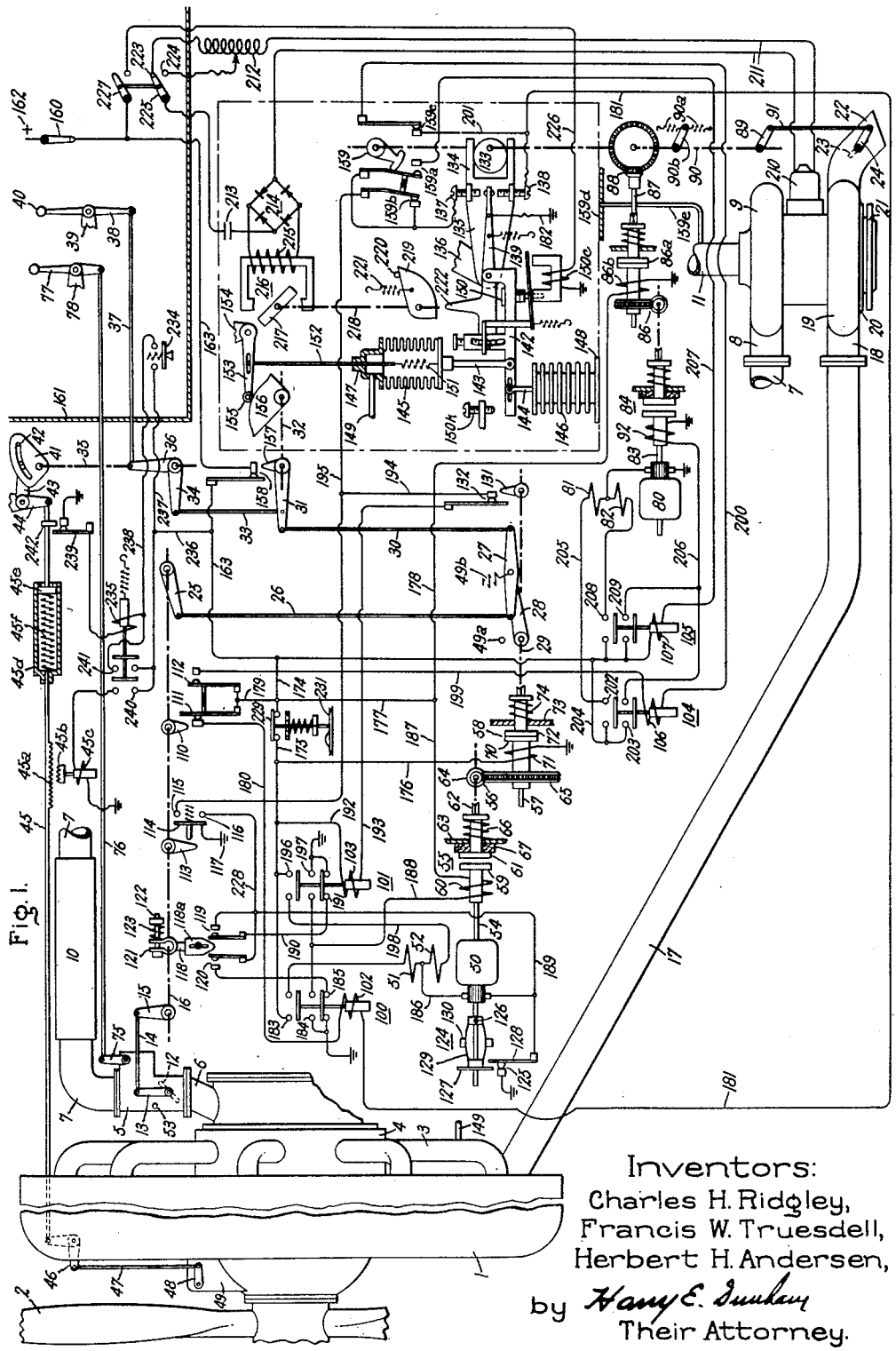

July 12, 1949.  C. H. RIDGLEY ET AL  2,476,063
CONTROL FOR SUPERCHARGED INTERNAL-COMBUSTION ENGINES
Filed Jan. 17, 1944  2 Sheets-Sheet 1

Inventors:
Charles H. Ridgley,
Francis W. Truesdell,
Herbert H. Andersen,
by Harry E. Dunham
Their Attorney.

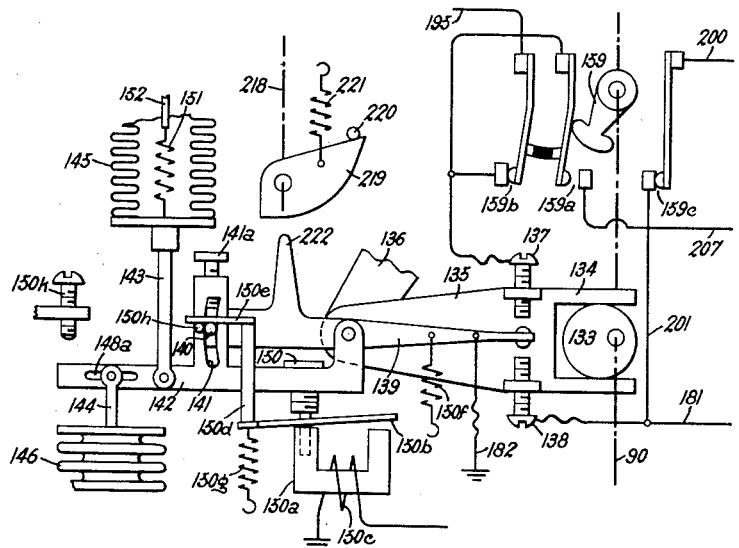

Patented July 12, 1949

2,476,063

UNITED STATES PATENT OFFICE 2,476,063

CONTROL FOR SUPERCHARGED INTERNAL-COMBUSTION ENGINES

Charles H. Ridgley, Marblehead, and Herbert H. Andersen, Beverly, Mass., and Francis W. Truesdell, Schenectady, N. Y., assignors to General Electric Company, a corporation of New York Application January 17, 1944, Serial No. 518,568

33 Claims. (Cl. 170—135.73)

1

The present invention relates to control for supercharged internal combustion engines. It is especially applicable to aircraft engines and it is this application of the invention which has been elected specifically for illustration and description. It is to be understood, however, that the invention, especially as to certain aspects, is not limited thereto but may be used wherever found applicable.

The object of the invention is to provide an improved control of the type referred to, and for a consideration of what is believed to be novel and the invention, attention is directed to the following specification and to the claims appended thereto.

In the drawing, Fig. 1 is a diagrammatic view of a supercharged aircraft internal combustion engine provided with a control embodying the invention; Fig. 2 is a detail view on a larger scale of parts shown in Fig. 1; Fig. 3 is a detail view of certain parts; Fig. 4 is a detail view of a modification, and Fig. 5 is a detail view of a further modification.

Referring to the drawing, 1 indicates an aircraft engine, an engine of the radial type being indicated, which drives an aircraft propeller 2. The intake pipes are indicated at 3. They serve to convey fuel mixture from a manifold 4 to the respective cylinders of the engine. Manifold 4 may be on the discharge side of and form a part of a supercharger driven through gearing from the engine shaft. The carburetor for the engine is indicated at 5. Its discharge side is connected to the engine by a pipe 6. Its inlet is connected by a pipe line 7 to the discharge side 8 of the compressor 9 of a supercharger, a compressor of the centrifugal type being shown. In pipe line 7, there may be arranged a known form of intercooler 10 for cooling the air discharged from compressor 9 on its way to the carburetor. In the interest of clearness, the intermediate portion of pipe line 7 has been omitted. The air inlet of compressor 9 is shown at 11. It may convey air from the aircraft slipstream to the inlet of the compressor, its inlet end, in known manner, facing into the slipstream so that when the aircraft is moving, air is rammed through conduit 11 to the compressor inlet. Thus the air supplied to the compressor inlet will be at a pressure higher than ambient pressure by an amount depending upon the speed of the aircraft. The pressure at the compressor inlet is termed usually the ram pressure.

Flow of fuel mixture at the carburetor is controlled by a usual form of throttle valve 12 on the spindle of which is an actuating arm 13 connected by a link 14 to an arm 15 fixed on a shaft 16. Shaft 16 may be carried in suitable bearings, not shown.

In the present instance a supercharger of the exhaust gas driven turbine type, termed a turbosupercharger, is illustrated. Exhaust conduit 17 of engine 1 is connected to the inlet 18 of the nozzle box 19 of the gas turbine which forms a part of the turbosupercharger. The nozzles of the gas turbine are indicated at 20 and the turbine wheel at 21. Connected with nozzle box 19 is a waste conduit 22 in which is located a waste valve 23. Valve 23 is carried on a suitable spindle on one end of which is an arm 24 through which valve 23 is moved. The operation of a turbosupercharger of the type illustrated is known. When waste gate valve 23 is fully open, as indicated in the drawing, substantially all the gases conveyed to the nozzle box discharge directly to atmosphere, little if any being directed through the nozzles against the turbine wheel. This represents a condition of no load on the turbosupercharger. As waste gate valve 23 is gradually closed, fewer gases escape through waste conduit 22 directly to atmosphere and more and more of the gases are directed through the nozzles to the turbine wheel, thus building up the speed of the turbosupercharger. As waste gate valve 23 is gradually closed, the pressure in the nozzle box is increased as is well understood. Maximum speed of the turbosupercharger is reached when waste gate valve 23 is fully closed, all the exhaust gases being then directed against the turbine wheel. The turbosupercharger illustrated is to be taken as typical of any suitable type of supercharger.

Fixed on shaft 16 is an arm 25 connected by a link 26 to one end of a lever 27 pivoted at an intermediate point on the end of an arm 28 fixed on a shaft 29. The other end of lever 27 is connected by a link 30 to the outer end of an arm 31 fixed on a shaft 32. Shafts 29 and 32 are mounted in suitable bearings, not shown. Arm 31 is connected by a link 33 to one arm 34 of a bell crank lever fixed at its elbow on a shaft 35 which shaft is mounted in suitable bearings, not shown. The other arm 36 of the bell crank lever is connected by a link 37 to a pilot control lever 38 pivoted on a fixed support 39 and having an operating ball 40 at its free end. Fixed on shaft 35 is a cam 41 having a cam slot 42 in which rides a pin on the end of one arm 43 of a bell crank lever which is pivoted at its elbow on a suitable support and has its other arm 44 connected by a rod 45, a bell crank lever 46 and a rod 47 to the operating arm 48 used to adjust the speed setting of the propeller governor 49 which controls the pitch of propeller 2 which in turn controls the engine speed.

With the foregoing arrangement, the pilot by moving control lever 38 can adjust simultaneously the throttle valve 12 of the carburetor and the setting of the propeller governor 49. When the upper end of control lever 38 is moved toward the left, shaft 16 is turned through the linkage mechanism in a direction to open the throttle valve. At the same time, cam 41 is moved in a direction to set the propeller governor for the engine speed desired for the particular throttle opening. When the upper end of control lever 38 is moved toward the right, shaft 16 is turned in a direction to move throttle valve 12 toward closed position, and simultaneously move cam 41 in a direction to set the propeller governor for the engine speed corresponding to the new control lever position. Thus, it will be seen that by means of control lever 38, the pilot can simultaneously adjust mechanically by direct connections both the throttle valve and the propeller governor.

Arm 28 and shaft 29 are biased toward a position wherein arm 28 engages a stop 49ᵃ by a suitable spring 49ᵇ. In other words, spring 49ᵇ tends to move arm 28 in a direction to effect a closing movement of throttle valve 12.

Rod 45 is provided with means whereby at any time it may be locked in an adjusted position thus locking the propeller governor in the position at which it is then set. To this end, it is shown as being provided with teeth 45ᵃ which form a rack adapted to be engaged by teeth on a locking head 45ᵇ carried by the plunger of an electromagnet 45ᶜ. When the winding of electromagnet 45ᶜ is energized, movement of its plunger brings the teeth on locking head 45ᵇ into engagement with teeth 45ᵃ to lock rod 45 in the position it occupies at the time. Locking rod 45 in a fixed position serves to lock the propeller governor in a fixed position. To permit of continued movement of pilot control lever 38 after rod 45 is locked in a fixed position, a yielding link is provided in the present instance by making rod 45 in two sections connected by telescoping sliding members comprising a casing 45ᵈ fixed to one rod end and a head 45ᵉ fixed on the other rod end and slidable in the casing but normally held against movement relative to the casing by a spring 45ᶠ located between the head and the other end of the casing. Spring 45ᶠ is of a stiffness such that normally rod 45 functions as a solid rod to position propeller governor 49. When the one section of rod 45 is locked against movement by energizing electromagnet 45ᶜ to bring the teeth on head 45ᵇ into engagement with the teeth 45ᵃ, the other section still can be moved by reason of the yielding of spring 45ᶠ thus permitting adjustment of the control lever 38 even though the propeller governor is locked in a fixed position.

In connection with the foregoing mechanical means operable directly by the pilot control lever for setting the throttle valve and the propeller governor for a desired engine load, there is provided electrical means for adjusting the throttle valve and for adjusting the waste gate valve to maintain automatically on the engine the load for which the control lever 38 is set. Such automatic adjustment may be under control of and responsive to any operating condition of the engine which bears a definite relation to the load or power output of the engine. Preferably it is under control of and responsive to the pressure on the discharge side of the gear driven supercharger, i. e., the intake manifold pressure. However, any other pressure such as the pressure of a torque nose which measures engine power output or the pressure between the carburetor and the geared supercharger may be used.

For positioning the throttle valve 12, there is provided a reversing electric motor 50 having a field winding 51 which effects operation of the motor in a direction to move throttle valve 12 toward open position and a field winding 52 which effects operation of the motor in a direction to move throttle valve 12 toward closed position. At 53 is a suitable stop which is engaged by arm 13 to limit the opening movement of throttle valve 12. Shaft 54 of motor 50 is adapted to be connected by a brake clutch 55 and gearing 56 to a shaft 57 which in turn is adapted to be connected by a clutch 58 to shaft 29. Brake clutch 55 comprises an electromagnet having an axially stationary armature 59 fixed on motor shaft 54 and provided with an energizing winding 60 and an axially movable armature 61 carried by a shaft 62 having a portion of larger diameter which slides in an opening in a fixed wall 63. Splined on shaft 62 is a worm gear 64 through which shaft 62 may slide axially. Worm gear 64 meshes with the teeth of a worm wheel 65 which forms a part of gearing 56. Movable armature 61 is biased to a position away from stationary armature 59 by a spring 66 positioned between wall 63 and a collar on the enlarged portion of shaft 62. When winding 60 is not energized, the parts stand in the positions shown in the drawing, movable armature 61 being spaced from stationary armature 59. When winding 60 is energized, armature 61 is moved axially into engagement with armature 59, shaft 62 sliding axially through worm gear 64, thus connecting the motor through gearing 56 and clutch 58 to shaft 29. When winding 60 is deenergized, spring 66 moves armature 61 away from stationary armature 59 to disconnect motor 50 from shaft 29 and to bring the movable armature 61 into engagement with a stationary friction disk 67 fixed to wall 63 to effect prompt stopping of turning movement of shaft 29. Clutch 58 comprises an electromagnet having a stationary armature 70 fixed on shaft 57 and provided with a winding 71 and an axially movable armature 72 carried by a sleeve which is splined on shaft 29 so that it may slide axially thereon. The sleeve which carries armature 72 is axially movable in an opening in a supporting wall 73 and is biased to a position in which armature 72 is separated from armature 70 by a spring 74 located between wall 73 and a collar on the sleeve. When winding 71 is energized, it effects movement of movable armature 72 into driving engagement with stationary armature 70, thus connecting shaft 57 to shaft 29. When winding 71 is deenergized, the clutch is opened by spring 74.

When motor 50 is operated in one direction or the other to turn shaft 29, it turns arm 28 to effect movement of lever 27, the lever pivoting around its right-hand end which is held fixed by reason of its connection to control lever 38, and through link 26 and shaft 16 effects adjustment of throttle valve 12. In this connection, it is to be understood that control lever 38 remains fixed in any position to which it may be adjusted either by reason of friction or a suitable locking arrangement.

At 75 is indicated the lever arm which is moved to adjust the fuel mixture. It is connected by a rod 76 to a pilot's hand control lever 77 which is pivoted on a fixed fulcrum indicated at 78. By means of lever 77, the pilot can at any time adjust the fuel mixture.

Waste gate valve 23 is positioned by a reversing electric motor 80 having a field 81 which, when energized, operates the motor in a direction to effect closing movement of waste gate valve 23 and a field 82 which, when energized, operates the motor in a direction to effect opening movement of waste gate valve 23. The shaft 83 of motor 80 is connected through a clutch brake 84, similar to clutch brake 55, and a worm gearing 86 to a shaft 87 which in turn is connected through a gearing 88, an arm 89 fixed on a gearing shaft 90, and a link 91 to waste gate operating arm 24. Brake clutch 84, being similar to brake clutch 55 already described, does not require further description. Its winding is indicated at 92. A clutch 86ᵃ, similar to clutch 58, is located in shaft 87 between gearings 86 and 88. Its winding is indicated at 86ᵇ.

Waste gate valve 23 is biased to a predetermined position by suitable biasing means whereby when it is free to move, for example when clutch 86ᵃ is disengaged, it will move to such position. In the present instance, it is shown as being biased to a partially closed position by a pair of opposed springs 90ᵃ operating on opposite sides of an arm 90ᵇ fixed on shaft 90. However, it is to be understood that this is only by way of example as it may be biased to fully open position, or it may be without biasing means. If without biasing means, the clutch 86ᵃ may be omitted. With clutch 86ᵃ omitted, valve 23 will remain in whatever position it may be adjusted to by its motor.

The circuits for field windings 51 and 52 of motor 50 are controlled by relays 100 and 101, respectively, the windings of which are indicated at 102 and 103. Similarly, the circuits for field windings 81 and 82 of motor 80 are controlled by relays 104 and 105, the relay windings of which are indicated at 106 and 107, respectively.

On shaft 16 is a fixed arm 110 which functions to open a limit switch 111 in circuit with relay winding 102 and to close a transfer switch 112. Switches 111 and 112 are biased to the position shown in the drawing wherein switch 111 is closed and switch 112 is open. They are engaged by arm 110 and moved to open switch 111 and close switch 112 when throttle valve 12 is almost open, lacking for example a few degrees of being fully open. Switch 111 and switch 112 are operated a few degrees prior to the time arm 13 on throttle valve 12 reaches stop 53. On shaft 16 is a second arm 113 which engages a bridging member 114, moving it into engagement with two contacts 115 and 116 and connecting the two contacts to ground, as indicated at 117. Arm 113 operates bridging member 114 during the final movement of throttle valve 12 to fully open position, the operation occurring after arm 110 has reversed the positions of switches 111 and 112. In other words, arm 113 operates bridging member 114 to connect contacts 115 and 116 to ground as arm 13 on throttle valve 12 moves through the final few degrees into engagement with stop 53 in which position throttle valve 12 is fully open.

Also, on shaft 16 is an operating arm 118 which stands between two normally open circuit closers 119 and 120. Arm 118 is not fixed rigidly on shaft 16 but is frictionally connected therewith by means of a yoke 121 which is held clamped around the shaft by a bolt 122 and spring 123. By adjusting the nut on the end of bolt 122, the compression of spring 123 can be adjusted to vary the friction with which yoke 121 is clamped on shaft 16. The arrangement is such that arm 118 moves with shaft 16 in either direction until it closes circuit closer 119 or 120 after which shaft 16 can continue to move, sliding in yoke 121 and maintaining the circuit closer 119 or 120 (as the case may be) closed. Adjustability of arm 118 with respect to circuit closers 119 and 120 is provided by making the free end of arm 118 in the form of an adjustable head 118ᵃ having a wedge-shaped end for engaging and moving the circuit closers. By adjusting head 118ᵃ by means of the screw and slot connection shown the beveled sides of the wedge-shaped head may be positioned with respect to the circuit closers to effect closing of them when a desired degree of movement of shaft 16 takes place.

On motor shaft 54 of motor 50 is a speed governor 124 which, when the speed of motor 50 reaches a predetermined high value, operates to open a circuit closer 125 of a type normally biased to closed position. In the present instance, a known type of fly weight speed governor is illustrated, it being shown as fixed at one end on an extension of shaft 54 as is indicated at 126, and as having its other movable end provided with a collar 127 adapted to engage the movable member 128 of circuit closer 125. The springs of the flywheel governor are indicated at 129 and the weights at 130. The arrangement illustrated is to be taken as typical of any suitable speed responsive device which, when the speed of motor 50 reaches a predetermined high value, effects an opening movement of circuit closer 125 and which when the speed decreases below a predetermined value permits the circuit closer to again close.

On shaft 29 is fixed an arm 131 which opens a limit switch 132 in circuit with relay winding 103 just prior to the time arm 28 reaches stop 49ᵃ.

Fixed on shaft 90 is a cam 133 (see Fig. 2) which engages with a yoke 134 on the end of an arm 135 pivoted on a fixed support 136. On arm 135 but electrically insulated therefrom and from each other (for example arm 135 may be formed from suitable insulating material) is a pair of adjustable contacts 137 and 138 between which is located one end of a contact arm 139 also pivoted on fixed support 136. The other end of arm 139 is provided with a pin 140 which fits in a slot 141 in a projecting ear on a lever 142. The upper end of slot 141 is defined by an adjustable stop in the form of a screw 141ᵃ which is threaded into the top wall of slot 141 and may be screwed up or down to vary the distance arm 139 and lever 142 may move relatively to each other before pin 140 strikes the end of stop screw 141ᵃ. One end of lever 142 is pivotally mounted on support 136, it being mounted around the same pivot as are levers 135 and 139. The other end of lever 142 is pivotally connected to stems 143 and 144 on the movable ends of flexible bellows 145 and 146. The other ends of bellows 145 and 146 are mounted on suitable fixed supports 147 and 148. Stem 144 of bellows 146 is connected to lever 142 at a distance from its fulcrum point on support 136 greater than that at which stem 143 of bellows 145 is connected. Thus, bellows 146 has a longer lever arm than does bellows 145. The length of the lever arm of bellows 146 may be adjusted by moving the bellows relatively to the arm, a pin and slot connection 148ᵃ being indicated to permit of such adjustment. Bellows 146 is evacuated. Bellows 145 has its interior connected by a pipe line 149 to the intake manifold of engine 1, beyond carburetor 5, whereby it is subjected to intake manifold pressure. The central portion of pipe line 149 is shown as being broken away in the interest of clearness. Bellows 145 and 146 are opposed to each other and both are subjected to the same pressure on their exterior.

Attached to lever 142 by a suitable stud 150 is the frame 150$^a$ of an electromagnet, the armature of which is indicated at 150$^b$ and the winding at 150$^c$. Armature 150$^b$ is pivoted on stud 150 and at its one end carries a post 150$^d$ on the free end of which is a finger 150$^e$ which extends along the side of the projection on lever 142 in which slot 141 is located. Pin 140 extends entirely through slot 141 so that its end stands under finger 150$^e$, the finger forming a stop for the pin against which it is held normally by a spring 150$^f$ attached to contact arm 139. Finger 150$^e$ is held normally in a fixed position by a spring 150$^g$ which holds finger 150$^e$ against a stop 150$^h$ on arm 142. When winding 150$^c$ is energized, armature 150$^b$ is moved about its pivot to bring its right-hand end down against the pole face of frame 150$^a$ against the action of spring 150$^g$ thus moving finger 150$^e$ upward away from pin 140 and stop 150$^h$. At 150$^k$ is an adjustable stop for limiting movement of lever 142 in the one direction.

Connected with the movable end of bellows 145 through the intermediary of a spring 151 is one end of a stem 152, the other end of which is pivotally connected to an intermediate point on an arm 153. One end of arm 153 is pivoted on a fixed support 154. Its other end is provided with a roller 155 which engages a cam surface on a cam 156 fixed on shaft 32. Movement of the cam surface of cam 156 under roller 155 serves to adjust the tension of spring 151 and hence the pressure setting of bellows 145, i. e., of the regulator. On shaft 32 is an arm 157 which, when control lever 38 is in idling position, engages the movable member of and opens a circuit closer 158 of a type which is biased to closed position.

Fixed on shaft 90 is an arm 159 which in one extreme position (the position in which waste gate valve 23 is wide open) engages and holds open a limit switch 159$^a$ for motor 80 and holds closed a transfer switch 159$^b$ for motor 50 and which in the other extreme position engages and holds open a second limit switch 159$^c$ for motor 80. Switches 159$^a$ and 159$^c$ are of a type biased toward closed position and switch 159$^b$ is of a type biased toward open position.

The control mechanism comprising bellows 145 and 146 and associated parts are enclosed preferably in a sealed casing 159$^d$ which is connected by a pipe line 159$^e$ to inlet conduit 11 of the compressor. Thus the pressure in casing 159$^d$ to which bellows 145 and 146 are subjected on their outer sides is the ram pressure which may be somewhat higher than ambient pressure and by an amount which may vary somewhat with operating conditions. However, while this arrangement is preferred, the control mechanism may be subjected to ambient pressure with satisfactory results.

The circuit connections and the functioning of the apparatus can be understood best by a description of the operation of the parts so far described.

The arrangement is such that the pilot can set his control lever for a desired engine load after which the regulator functions automatically to adjust throttle valve 12 and waste gate valve 23 to maintain such load on the engine. In moving his control lever at a time when throttle valve 12 is not substantially fully open, the pilot manually adjusts throttle valve 12 and at the same time he adjusts the setting of the regulator, i. e., the tension of spring 151. Also, at the same time he adjusts the setting of the propeller governor 49. However, the arrangement is such that when the pilot moves his control lever, adjusting simultaneously the position of throttle valve 12 and the setting of the regulator, the regulator is set for an intake pressure somewhat higher than that for which the control lever sets the throttle valve. As a result, whenever the pilot sets the control lever for a desired load, he actually sets the regulator for such load and the throttle valve for a load somewhat less. The result is that after the control lever has been moved to a new position, the regulator functions to further move the throttle valve. This arrangement is one important feature of the invention as is pointed out more fully hereinafter.

The pilot having set his control lever for a certain load, then as the aircraft changes altitude the throttle valve 12 and waste gate valve 23 are operated automatically to maintain constant the intake manifold pressure corresponding to the load for which the control lever is set. To this end, throttle valve 12 is first substantially fully opened after which waste gate valve 23 is gradually closed, thus bringing the supercharger into operation.

It is to be noted that control lever 38 is at all times directly mechanically connected to throttle valve 12 so that at any time the pilot can operate throttle valve 12 independently of the functioning of the automatic control.

In the drawing, control lever 38 is shown as occupying an intermediate position, thus setting the propeller governor for a certain engine speed and the regulator spring 151 for a certain intake manifold pressure. The main switch 160 located in the pilot's cabin 161 is closed, thus connecting a suitable source of current 162 to a main line wire 163. Circuit closer 158 is in main line wire 163 and such circuit closer is in closed position since control lever 38 is not in idling position. When switch 160 is closed and control lever 38 is in a position other than engine idling position, a circuit is closed through clutch winding 71 by way of line wire 163 and conductors 174, 175 and 176 to ground to effect closing of clutch 58 thus connecting shaft 57 to shaft 29. Also a circuit is closed through clutch winding 86$^b$ by way of line wire 163 and conductors 174, 177 and 178 to ground to effect closing of clutch 86$^a$ thus connecting gearing 86 to gearing 88. Contact lever 139 is midway between contacts 137 and 138 which means that there obtains in the intake manifold a pressure corresponding to that for which the regulator has been set. The positions of the parts in the drawing assume also that flight conditions are such that the intake manifold pressure for which the regulator has been set is being maintained with the throttle valve 12 partly open and with the waste gate valve wide open. This would mean relatively low altitude since the intake manifold pressure is being maintained without supercharging with the turbo-supercharger and with partly open throttle.

If now the intake manifold pressure decreases for any reason, for example because of an increase in aircraft altitude, bellows 145 collapses somewhat, lifting the left-hand end of lever 142 and bringing contact arm 139 into engagement with contact 138. Since spring 150ᶠ holds pin 140 against finger 150ᵉ, the two levers 142 and 139 move as a unit. This closes a circuit on relay winding 102 which may be traced as follows: source 162, switch 160, main line wire 163, conductors 174, 179, limit switch 111, conductor 180, relay winding 102, conductor 181, contact 138, contact lever 139 and conductor 182 to ground. Relay 100 thereupon picks up, closing its two sets of forward contacts 183 and 184 and opening its set of back contacts 185. The closing of contacts 183 closes a circuit on winding 51 of motor 50 as follows: source 162, switch 160, main conductor 163, conductors 174 and 175, relays contacts 183, motor field winding 51, conductor 186 and circuit closer 125 to ground. At the same time a circuit is closed through relay contacts 184 on clutch magnet winding 60 which may be traced as follows: source 162, switch 160, conductor 163, conductors 174, 177 and 187, winding 60, conductor 188 and relay contacts 184 to ground. Thus simultaneously motor 50 is started in operation and brake clutch 55 is closed to effect turning movement of shaft 29 to move lever 27 in a direction to lower rod 26, thus turning the shaft 16 in a direction to move throttle valve 12 toward open position, thus effecting an increase in intake manifold pressure. At this time, the right-hand end of lever 27 is fixed in position forming a fulcrum about which lever 27 is turned by arm 28. As soon as motor 50 picks up to a predetermined speed, speed governor 124 comes into operation to open circuit closer 125, thus opening the circuit on field winding 51. As a result, motor 50 begins immediately to slow down. As soon as motor 50 slows down a predetermined amount, circuit closer 125 is permitted again to close, thus again energizing field winding 51. As a result, the field winding of motor 51 is given a plurality of short current impulses which, in effect, function to operate motor 50 at a low speed, thus effecting a slow opening movement of throttle valve 12. If, as a result of this slow opening movement, throttle valve 12 is opened sufficiently to restore the manifold pressure, then bellows 145 is distended to move contact arm 139 away from contact 138, thus opening the circuit and leaving the throttle valve in its new position. If, however, as a result of the slow movement, the throttle valve 12 has not been moved sufficiently to restore the manifold pressure, arm 118 on shaft 16 closes circuit closer 119, thus providing a shunt circuit around the speed governor operated circuit closer 125 by way of conductor 189, circuit closer 119, conductor 190 and back contacts 191 of relay 101 to ground. Accordingly, as long as circuit closer 119 is held closed, motor 50 operates continuously to adjust throttle valve 12 toward open position. This means that valve 12 is adjusted toward open position more rapidly, thus quickly restoring the desired intake manifold pressure. After arm 118 has closed circuit closer 119, shaft 16 is permitted continued movement due to the frictional connection between arm 118 and shaft 16, as already explained.

In case the manifold pressure increases for any reason, for example, because of a decrease in aircraft altitude, bellows 145 is distended somewhat, bringing contact arm 139 into engagement with contact 137. This closes a circuit on relay winding 103 which may be traced as follows: source 162, main line wire 163, conductors 174, 175 and 192, relay winding 103, conductor 193, limit switch 132, conductor 194, conductor 195, transfer switch 159ᵇ, contact 137, contact arm 139 and conductor 182 to ground. Relay 101 thereupon picks up, closing its two sets of forward contacts 196 and 197 and opening its set of back contacts 191. The closing of contacts 196 closes a circuit on winding 52 of motor 50 as follows: source 162, main conductor 163, conductors 174 and 175, relay contacts 196, conductor 198, motor field winding 52, conductor 186, and circuit closer 125 to ground. At the same time a circuit is closed through relay contacts 197 on clutch magnet winding 60 which may be traced as follows: source 162, conductor 163, conductors 174, 177 and 187, winding 60, conductor 188 and relay contacts 197 to ground. Thus, simultaneously motor 50 is started into operation and brake clutch 55 is closed to effect turning movement of shaft 29 to move lever 27 in a direction to lift rod 26, thus turning shaft 16 in a direction to move throttle valve 12 toward closed position, thus effecting a decrease in intake manifold pressure. As soon as motor 50 picks up to a predetermined speed, speed governor 124 comes into operation to open and close circuit closer 125 thus opening and closing the circuit on field winding 52 to effect operation of motor 50 at a slow rate of speed in the manner already described. If, as a result of this slow operation of motor 50, throttle valve 12 is closed sufficiently to restore the manifold pressure, then bellows 145 collapses to move contact arm 139 away from contact 137 thus opening the circuit and leaving the throttle valve in its new position. If, however, as a result of the slow operation, throttle valve 12 has not been moved sufficiently to restore the intake manifold pressure to the desired value, arm 118 closes circuit closer 120 to shunt out speed governor circuit closer 125 after the manner already explained in connection with the operation of circuit closer 119, the circuit being to ground by way of the back contacts 185 of relay 100. Motor 50 then operates at a higher rate of speed to effect more rapid adjustment of throttle valve 12 after the manner already explained so as to promptly restore intake manifold pressure.

In connection with the operation of throttle valve 12, when motor 50 operates at its full speed in a direction either to move throttle valve 12 toward open or toward closed position, the intake manifold pressure may "overshoot," becoming either too high or too low, as the case may be. As a result of this, contact arm 139 on the regulator, when it leaves the one contact with which it is in engagement, may move across into engagement with the other contact. When this happens, a readjustment of the throttle valve 12 in the other direction takes place. In other words, in case of a decrease in intake manifold pressure, the throttle valve may be opened to an extent such that the intake manifold pressure will be increased to a value higher than the desired pressure after which the throttle valve will be readjusted slightly toward closed position to restore the pressure to the desired value. Similarly, in the case of an increase in intake manifold pressure, the throttle valve 12 may be closed to an extent such that the intake manifold pressure will be decreased to a value lower than the desired pressure after which throttle valve 12 will be readjusted slightly toward open position to restore the pressure to the desired value.

In connection with the operation of arm 118 on shaft 16, it will be noted that circuit closer 119 is in circuit with the back contacts 191 of relay 101 and that circuit closer 120 is in circuit with the back contacts 185 of relay 100. The purpose of this arrangement is to prevent the shunting of speed governor controlled circuit closer 125 when the position of contact arm 139 is reversed due to "overshooting" of the intake manifold pressure, thus assuring that any readjustment takes place at the lower motor speed. For example, when regulator contact arm 139 is in engagement with contact 138 and relay winding 102 is energized calling for movement of throttle valve 12 toward open position and arm 118 is holding circuit closer 119 closed to shunt out speed governor controlled circuit closer 125, the shunt circuit to ground around circuit closer 125 is by way of relay back contacts 191. Now when regulator contact arm 139 reverses its position, moving from engagement with contact 138 into engagement with contact 137 and energizing the winding 103 of relay 101 to effect readjustment of valve 12 toward closed position, the opening of relay contacts 191 opens the shunt circuit around speed governor operated circuit closer 125, thus insuring that motor 50 operates at its low speed even though circuit closer 119 is being held closed by arm 118. Thus, any readjustment of throttle valve 12 in either direction as a result of the pressure regulator causing the manifold pressure to "overshoot" takes place at the lower motor speed.

As pointed out already, when control lever 38 is moved at a time when throttle valve 12 is not substantially fully open, to set throttle valve 12 for a different engine power or load, spring 151 is adjusted simultaneously to set the regulator for a slightly higher engine power or load so that after the throttle valve has been set manually, a further adjustment of the throttle valve is effected by the automatic regulator. If the movement of control lever 38 is of more than a nominal amount, shaft 16 is turned to an extent such that either circuit closer 119 or 120 is closed depending on the direction of movement. This closes the shunt circuit around speed governor operated switch 125, which means that operation of motor 50 to effect the further adjustment of the throttle valve will be at its higher speed. Thus with hand operation, throttle valve 12 is quickly adjusted to the desired final position.

When the regulator in functioning to maintain the intake manifold pressure for which control lever 38 is set, has opened throttle valve 12 to a position such that it is substantially fully open (but prior to the time it is fully open and arm 13 engages stop 53), arm 110 on shaft 16 functions to open limit switch 111 and to close transfer switch 112. The opening of limit switch 111 opens the circuit of winding 102 of relay 100, thus preventing further operation of motor 50 in a direction to open throttle valve 12. The closing of transfer switch 112 closes a circuit on the winding 106 of relay 104 as follows: source 162, main line conductor 163, transfer switch 112, conductor 199, relay winding 106, conductor 200, limit switch 159c, conductor 201, contact 138, contact arm 139 and conductor 182 to ground. This causes relay 104 to pick up, closing its two sets of contacts 202 and 203. Closing of contacts 202 closes a circuit on field winding 81 of motor 80 as follows: source 162, main line conductor 163, conductor 204, relay contacts 202, conductor 205 and field winding 81 to ground. At the same time, a circuit is closed through relay contacts 203 to brake clutch winding 92 as follows: source 162, main line conductor 163, conductor 204, relay contacts 203, conductor 206, and clutch winding 92 to ground. Thus, motor 80 is started into operation and motor shaft 83 is clutched to gearing 86 to effect turning movement of shaft 90 and arm 89 in a direction to lift link 91 and arm 24 and move waste gate valve 23 toward closed position. As already explained, this serves to put the supercharger into operation, waste gate valve 23 being moved toward closed position to an extent such that the turbosupercharger will be operated at a speed to restore the intake manifold pressure. Turning of shaft 90 in a direction to move waste gate valve 23 toward closed position turns cam 133 in a counter-clockwise direction to effect movement of arm 135 downward and thus move contact 138 away from contact arm 139. Cam 133 thus functions as a follow-up device or restoring mechanism for the regulating device to prevent "overshooting" and to give stable operation.

From the foregoing, it will be seen that when the regulator, due to decrease in intake manifold pressure calls for further operation after throttle valve 12 has been substantially fully opened, the control for effecting an increase in intake manifold pressure is transferred from motor 50 to motor 80.

The initial turning movement of shaft 90 moves arm 159 away from the movable elements of limit switch 159a and transfer switch 159b, permitting the limit switch to close and the transfer switch to open.

If the intake manifold pressure again decreases, contact arm 139 will be brought into engagement with contact 138 again closing the circuit on relay winding 106 of relay 104 to effect a further movement of waste gate valve 23 toward closed position in the manner already described. Now, should the intake manifold pressure increase, contact arm 139 will be moved into engagement with contact 137 closing a circuit on relay winding 107 of relay 105 which may be traced as follows: source 162, main line conductor 163, relay winding 107, conductor 207, limit switch 159a, contact 137, contact arm 139, and conductor 182 to ground. This causes relay 105 to pick up, closing its two sets of contacts 208 and 209. Closing of contacts 208 closes a circuit on field winding 82 of motor 80, which may be traced as follows: source 162, main line conductor 163, relay contacts 208, and field winding 82 to ground. At the same time, the closing of the circuit across relay contacts 209 closes a circuit on clutch winding 92 which may be traced as follows: source 162, main line conductor 163, relay contacts 209, conductor 206, and clutch winding 92 to ground. As a result, brake clutch 84 is closed and motor 80 operates in a direction to move waste gate valve 23 toward open position, thus effecting a decrease in pressure in the intake manifold. During its operation, shaft 90 turns cam disk 133 in a clockwise direction thus lifting the right-hand end of lever 135 to move contact 137 away from contact arm 139. If the regulator calls continuously for increase in manifold pressure, waste gate valve 23 is continuously moved toward closed position until it reaches a maximum at which time arm 159 on shaft 90 opens limit switch 159c, thus preventing further operation of motor 80 in a direction to effect closing movement of waste gate valve 23. On the other hand, if while the supercharger is in operation, the intake manifold pressure continues to increase, motor 80 will be operated by the regulator to effect opening movement of waste gate valve 23 until it is fully open whereupon arm 159 on shaft 90 engages and opens limit switch 159ª and closes transfer switch 159ᵇ. When transfer switch 159ᵇ is closed, a circuit is closed on winding 103 of relay 101 which may be traced as follows: source 162, main line conductor 163, conductors 174, 175, 192, relay winding 103, conductor 193, limit switch 132, conductor 194, conductor 195, transfer switch 159ᵇ, contact 137, contact arm 139 and conductor 182 to ground. This causes relay 101 to close, thus effecting operation of throttle valve 12 toward closed position to effect a decrease in the intake manifold pressure. Thus, it will be seen that when the regulator, due to increase in intake manifold pressure, calls for further operation after waste gate valve 23 is fully open, the control for effecting a decrease in intake manifold pressure is transferred from motor 80 back to motor 50.

Considering the foregoing, it will be seen that when the control is operating on throttle valve 12, opening of limit switch 111 opens the circuit through control contact 138 and relay winding 102, the closing of which circuit by contact arm 139 effects operation of motor 50 in a direction to open throttle valve 12, and the closing of transfer switch 112 closes the circuit between control contact 138 and relay winding 106, the closing of which circuit by control arm 139 effects operation of motor 80 in a direction to close waste gate valve 23; and conversely, when the control is operating on waste gate valve 23, the opening of limit switch 159ª opens the circuit between control contact 137 and relay winding 107, the closing of which circuit by control arm 139 effects operation of motor 80 in a direction to open waste gate valve 23, and the closing of transfer switch 159ᵇ closes the circuit between control contact 137 and relay winding 103, the closing of which by control arm 139 effects operation of motor 50 in a direction to close throttle valve 12.

The circuit of relay winding 102 of relay 100, the relay which closes the circuit on field winding 51 of motor 50 to operate it in a direction to open throttle valve 12, is connected always to control contact 138 except when limit switch 111 is open; and similarly relay winding 107 of relay 105, which relay closes the circuit on field winding 82 of motor 80 to operate it in a direction to open waste gate valve 12, is connected always to control contact 137 except when limit switch 159ª is open. Thus, whenever limit switch 111 is in closed position, throttle valve 12 can be operated toward open position to increase the manifold pressure by the control arm 139 engaging contact 138 and whenever limit switch 159ª is in closed position, waste gate valve 23 can be operated toward open position to decrease the manifold pressure by control arm 139 engaging contact 137.

In connection with the supercharger and the regulating mechanism, there is provided means to prevent the regulator effecting operation of the supercharger at a speed above a predetermined high value. In other words, there is provided a maximum speed governor for the supercharger. To this end, there is provided a means which, when the speed of the supercharger reaches a predetermined high value, operates automatically to take the control away from bellows 145 and 146 and substitute therefor a means responsive to supercharger speed thereby placing waste gate valve 23 under control of such speed responsive means. In the present instance, this speed responsive means is shown as comprising an alternating current generator 210 driven by the supercharger so that its speed is proportional to the supercharger speed. For example, it may be driven from the supercharger oil pump shaft. The output of generator 210 is connected by conductors 211 to a load circuit through a tuned circuit comprising an inductance 212 and a capacitor 213 serially arranged with respect to one another. The purpose of this tuned circuit is to make the overspeed control more sensitive when the supercharger is operating near its maximum speed by arranging the values of the inductance 212 and capacitor 213 so that they provide a resonant circuit at the frequency of generator 210 when operating at the maximum speed of the supercharger. With this arrangement, at maximum speed the capacitance and inductance neutralize one another and output current from generator 210 is limited only by the resistance of the circuit. The output of generator 210, which passes through the resonant circuit just described, is impressed across the one set of terminals of a full wave rectifier 214. The other set of terminals of rectifier 214 is connected to the winding 215 of a suitable torque motor 216 so that a direct current is impressed across winding 215. Torque motor 216 has an armature 217 which is connected by means of a shaft 218 to a cam 219. Armature 217 and cam 219 are biased in a direction such that cam 219 engages a stop 220 by means of a spring 221. When a current of sufficient magnitude energizes winding 215, armature 217 of torque motor 216 is rotated in a clockwise direction against the tension of spring 221 to bring cam 219 into engagement with a projection 222 on contact arm 139 whereupon torque motor 216 takes control of the contact arm 139 away from bellows 145 and 146 and spring 151. The pin and slot connection comprising pin 140 and slot 141, respectively, provides a mechanical take-over which permits motor 216 to move contact arm 139 independently of lever 142 and bellows 145 and 146.

To enable the pilot to adjust the maximum speed of the speed regulator or governor, inductance 212 may be provided with one or more taps by means of which its value may be adjusted. In the present instance, two taps 223 and 224 are shown either of which may be connected into circuit by a pilot's hand switch 225. Tap 223 may represent the rated or normal safe maximum speed for the supercharger while tap 224 may represent a certain percentage over speed, it being intended for use primarily in case of emergency of a character such that the pilot finds it desirable to over speed the supercharger for a short time to increase his engine power.

Stop 150ᵏ serves to limit the turning movement of lever 142 in a clockwise direction as viewed in Fig. 1. The stop is adjusted to a position such that it limits upward movement of the left-hand end of lever 142 to that position which still will permit operation of contact 138 and arm 139 when cam 133 and arm 135 are in their extreme counterclockwise or down positions but will not permit of its movement beyond such point.

The maximum speed governor functions to limit the maximum speed to which the supercharger may be brought by the regulator in its effort to maintain the intake manifold pressure for which the control lever 38 may be set.

The function of the finger 150ᵉ is to permit of an increase in the intake manifold pressure beyond that for which the regulator is set normally by control lever 38, a thing which may be desirable under certain emergency conditions. To this end, winding 150c is connected in circuit by a conductor 226 and a pilot's hand switch 227 to source 162. When switch 227 is closed, armature 150b is actuated to bring its right-hand end into engagement with the adjacent pole face, thus lifting flinger 150e away from pin 150h to a position where it is above the lower end of adjustable stop screw 141a. This frees lever 139 for movement and spring 150f will tend to move it into engagement with the end of stop screw 141a. As a result, the end of lever 139 engages contact 138, whereupon the control mechanism operates to effect an increase in manifold pressure, the increase being that defined by the adjustment of stop screw 141a. When the desired higher pressure is reached adjustment screw 141a and pin 140 engage to control the pressure at this value. In effect, the arrangement operates to permit of the adjustment of the linkage or connections between the bellows 144 and 145 and the contact arm 139 thus changing the intake manifold pressure represented by a given position of the control lever 38. Ordinarily, this adjustment will be used only when the pilot, after having brought his control lever 38 to normal maximum power position, finds that to meet an emergency he needs, at least temporarily, a further increase in power. This he can obtain quickly by closing switch 227 to effect the operation already described. Stop screw 141a may be set to permit the pilot to obtain an intake manifold pressure a predetermined amount higher than the maximum which can be obtained normally by movement of control lever 38.

To advantage, pilot's hand switches 225 and 227 may be connected together for simultaneous operation as shown, although they may be arranged for separate operation. When both are closed, the regulator is set for a higher maximum intake manifold pressure and the maximum speed governor is set for a higher maximum supercharger speed. Thus, if needed, a supercharger speed higher than that normally permitted may be obtained in order to obtain the higher manifold pressure.

In the drawing, control lever 38 is shown as being positioned for an intermediate load on engine 1; throttle valve 12 is shown as being in a partly open position, and waste gate valve 23 is shown as being wide open. This may represent the positions of the respective valves in order to maintain the desired load on the engine, i. e., the desired intake manifold pressure in the present instance, at a certain altitude. For operation at a lower altitude, throttle valve 12 would be adjusted by the automatic regulator toward closed position. For operation at a higher altitude, throttle valve 12 would be adjusted by the automatic regulator toward open position. And, when substantially fully open, lacking only a few degrees, as already explained, waste gate valve 23 will be gradually closed by the automatic regulator. Thus, for any particular setting of control lever 38, throttle valve 12 may be partially open and waste gate valve 23 fully open; substantially fully open and waste gate valve 27 fully open; or substantially fully open and waste gate valve 23 closed to a lesser or greater degree depending on the altitude. This is because the amount of supercharging required varies directly with the altitude.

At any time, the pilot can decrease or increase the load on the engine by adjusting his control lever 38. If a decrease in load is desired, control lever 38 is moved in a clockwise direction, as shown in the drawing to simultaneously move throttle valve 12 toward closed position and adjust the tension of regulator spring 151. If at this time waste gate valve 23 is fully open, the automatic regulation being effected by means of throttle valve 12, the control lever 38 first moves the valve 12 to a new position after which the regulator adjusts the throttle valve for the new pressure for which regulator spring 151 is set. As already explained, a movement of control lever 38 sets the regulator for an intake manifold pressure slightly higher than that to which the throttle valve 12 is adjusted. If at the time control lever 38 is moved, throttle lever 12 is substantially fully open and waste gate valve 23 is partially closed, then waste gate valve 23 will be adjusted to bring the intake manifold pressure down to the desired value. Under these conditions, throttle valve 12 will have been moved somewhat toward closed position and will remain in such position until there occurs the first demand by the regulator for an increase in intake manifold pressure at which time the throttle valve will be moved toward open position since when throttle valve 12 was moved toward closed position, transfer switch 111 was permitted to close, thus closing the circuit between control contact 138 and relay winding 102. This is not material, however, since the initial degrees of movement of a valve of the type of a throttle valve from open position toward closed position has little regulating effect on the flow past it.

Similarly, the pilot can increase the load on the engine at any time by moving control lever 38 in an anti-clockwise direction, as shown in the drawing. If at the time the control lever is moved to increase the engine power, the regulator is operating on throttle valve 12, waste gate valve 23 being wide open, then the throttle valve is moved toward open position, the regulator spring 151 is reset for the higher intake manifold pressure, and the regulator takes control to finally position valve 12 for the higher pressure. If at the time control lever 38 is moved to increase engine power, throttle valve 12 is in its substantially fully open position and the regulator is operating on waste gate valve 23, then spring 151 will be reset for a higher intake manifold pressure and the regulator will effect operation of motor 80 to move waste gate valve 23 toward closed position by the amount necessary to give the increased manifold pressure corresponding to the new regulator setting. At the same time throttle operating motor 50 will be operated in a direction to move throttle valve 12 toward closed position, thus preventing the movement of control lever 38 from jamming the mechanical connection between the control lever and throttle valve 12. This latter result is effected as follows: When control lever 38 is moved to readjust the setting of regulator spring 151 at a time when throttle valve 12 is in its substantially fully open position, the first movement of the lever brings arm 113 on shaft 16 into engagement with bridging contact 114 to connect contacts 115 and 116 directly to ground and a further movement brings arm 13 on the throttle valve into contact with stop 53. Connecting contact 115 to ground closes a circuit on field winding 52 of motor 50 to effect operation of the motor in a direction to move throttle valve 12 toward closed position; and connecting contact 116 to ground operates to connect a shunt circuit around speed governor operated circuit closer 125 so that motor 50 operates at its higher rate of speed. When contact 115 is grounded by bringing member 114, a circuit is closed through relay winding 103 which may be traced as follows: source 162, main line conductor 163, conductors 174, 175 and 192, relay winding 103, conductor 193, limit switch 132, conductors 194, 195, and contact 116 to ground at 117. This causes relay 101 to pick up which effects closing of brake clutch 55 and operation of motor 50 in a direction to move throttle valve 12 toward closed position in the manner already explained. At the same time the grounding of contact 116 connects a shunt circuit to ground around speed governor operated circuit closer 125 by way of conductor 189, conductor 228, and contact 116 to ground at 117. Thus by utilizing the final few degrees of movement of throttle valve 12 toward open position to effect operation of motor 50 at its higher speed in a direction to move valve 12 toward closed position, the pilot, irrespective of the positions of throttle valve 12 and waste gate valve 23, can always safely move his control lever 38 to set the regulator for a higher intake manifold pressure and a higher load on the engine.

This arrangement whereby when the control lever is operated to adjust the regulator for a higher intake manifold pressure at a time when the regulator is working on the waste gate valve, there is effected, so to speak, an operation of the throttle valve in a direction opposite to that in which the control lever tends to move it, is regarded as an important feature of the invention. By such arrangement, the control lever is always directly mechanically connected to the throttle valve. This is advantageous since by reason of such arrangement whereby the control lever 38 is directly mechanically connected to the throttle valve 12 and always remains so connected, the pilot can directly mechanically operate the throttle valve quite independently of motor 50 or the automatic regulator. This is important since if at any time the regulator fails to function, the pilot is always in a position to take over the control manually, and by such manual control he always can operate the throttle valve throughout its entire range. In this connection, it is pointed out that the engine may be controlled manually by throttle 12, irrespective of the position of waste gate valve 23. This represents, of course, what may be termed emergency operating conditions and is not the intended normal functioning of the apparatus.

When control lever 38 is in idling position, circuit closer 158 is held open by arm 157 on shaft 32 whereby the automatic regulator is disconnected from the circuit. Also, the automatic regulator may be disconnected from the circuit by opening switch 160 which is located in the pilot's cockpit.

When taxying and when landing, it is desirable to have the engine throttle valve on manual control alone and not on automatic control. Also on take off, it is preferable to have the engine throttle valve on manual control alone although on take off there may be times when some supercharging is required to give the needed power. To meet these conditions, there is provided means whereby the waste gate valve motor 80 only may be connected to the automatic regulator, throttle motor 50 being disconnected therefrom. Such means may be operated manually. Preferably, however, such means is placed under control of the landing gear in a manner such that when the landing gear is down only waste gate valve motor 80 is connected to the automatic regulator while when the landing gear is up, both motors 80 and 50 are connected to the automatic regulator. Or otherwise stated, assuming both motors are connected to the automatic regulator and the landing gear is up for normal flight conditions, then when the landing gear is lowered to make a landing, the throttle operating motor 50 is automatically disconnected from the automatic regulator.

To accomplish the foregoing, there is provided a switch 229 in the power circuit to the relay contacts 183 and 196 which control the circuits of motor field windings 51 and 52 of throttle motor 50. By opening switch 229, the automatic regulator is disconnected from the throttle valve 12, while it remains connected to waste gate valve 23.

If switch 229 is manually controlled, then on take off the pilot may close main switch 160 to put power on the regulating system and open switch 229 to disconnect motor 50 from the power circuit. Then, if when control lever 38 is moved to take off position, in which position throttle valve 12 is substantially fully open, the desired intake manifold pressure called for by the setting of lever 38 does not obtain, the regulator will operate to effect closing movement of waste gate valve 23 to the extent needed to operate the supercharger at a speed which will give the desired intake manifold pressure. In this connection, it is to be noted that when control lever 38 is moved to take off position, arm 110 on shaft 16 closes transfer switch 112 to connect the regulator to motor 80.

As stated above, switch 229 may be operated automatically by placing it under control of the aircraft landing gear, the arrangement being such that when the landing gear is down, the switch is held open while when the landing gear is retracted, the switch is closed. In the drawing 230 is a spring which biases switch 229 to closed position and 231 is a rod connected with the landing gear operating lever and operated by the landing gear operating lever to open the switch when the landing gear is down. Referring to Fig. 3, rod 231 is provided with a cam or projection 232 which slides under the switch stem to open the switch when the landing gear lever 233 is moved to lower the landing gear.

After take off, the pilot may open switch 160 and operate the engine manually by means of throttle valve 12, the automatic control being disconnected until such time as he desires to place the engine under automatic control.

As already pointed out, cam 133, in adjusting arm 135 and thus the contacts 137 and 138, functions as a follow-up device to provide a certain width of regulation or pressure droop between light load and full load on the turbosupercharger to give stability to the regulator and prevent hunting when controlling the turbosupercharger. This means that for any given setting of the regulator the pressure maintained at full load on the turbosupercharger is a certain amount lower than at light load on the turbosupercharger. The purpose in providing for bellows 146 a lever arm longer than that for bellows 145, in other words, having the bellows offset relatively to each other, is to compensate in part at least for such pressure drop so as to decrease the amount of the pressure decrease between full load and light load on the turbosupercharger. Bellows 146 and 145 are of the same diameter, each is subjected on its outer surface to the pressure in casing $159^d$ and they are arranged to oppose each other. The torque resulting from the pull of each bellows on lever 142 is proportional to the bellows area and the distance of its connection from the pivot point. Accordingly, as the pressure in casing 159d decreases with increase in altitude (which means also increase in load on the supercharger) the effective torque resulting from the pull of bellows 146 on lever 142 decreases proportionately more rapidly than does the effective torque resulting from the pull of bellows 145 on lever 142 whereby a proportionately higher pressure in bellows 145 will be required to reestablish a balanced condition of the two torques. In other words, the greater leverage through which bellows 146 acts to readjust the regulator serves to counterbalance to a predetermined extent the action of cam 133. As a result, the actual pressure droop or width of regulation of the regulator is decreased over what it would be were bellows 145 and 146 not offset relatively to each other.

Features of the regulator disclosed are not claimed herein specifically as they form subject matter of an application of Martin Levine, Serial No. 518,532, now Patent 2,376,144, filed on even date herewith and assigned to the same assignee as the present application.

When control lever 38 is moved, lever 27 pivots on the end of arm 28 to raise and lower rod 26 and thus adjust throttle valve 12; and when motor 50 turns shaft 29, lever 27 pivots around the lower end of rod 30 to raise and lower rod 26 to adjust the throttle valve. These two adjustments are additive, the position of the throttle valve at any time being the sum of the two movements. Spring 49b biases arm 28 to a position in engagement with stop 49a. When lever arm 28 is in engagement with stop 49a, the pilot has full control of the throttle valve.

Whenever solenoid winding 71 is deenergized by the opening of switch 160 or circuit closer 158, or by electric power failure, clutch 58 is disengaged and lever arm 28 moves instantly into engagement with stop 49a, bringing throttle valve 12 to a position corresponding to the position occupied by control lever 38. At the same time, if a clutch 86a is provided, it will be disengaged, permitting waste gate valve 23 to be moved to the position to which it is biased by springs 90a. If a clutch 86a is not provided, then waste gate valve 23 will remain in the position to which it has been adjusted by its motor 80.

Intake manifold pressure is a measure of the power output of the engine. By setting control lever 38 for a desired engine power output, the maintaining of the corresponding intake manifold pressure constant (assuming constant engine speed), maintains on the engine the power output for which the control lever is set. For every intake manifold pressure, i. e., engine power output, there is a definite engine speed which gives best engine efficiency, and cam slot 42 is shaped to set the propeller governor for such engine speed. Under certain conditions, however, for example, to obtain better efficiency on long flights at cruising speeds, it may be desirable to adjust the intake manifold pressure relatively to the engine speed. In other words, to change the relation between power output and engine speed. To accomplish this, the pilot may, after setting his control lever for a certain power output and engine speed, close a push button switch 234 thus closing a circuit on the winding 235 of a normally open relay of the self locking-in type as follows: main line conductor 163, conductors 236 and 237, push button switch 234, conductor 238, relay winding 235 and a normally closed circuit closer 239 to ground. This causes the relay to pick up, bridging its two sets of contacts 240 and 241. Bridging of contacts 240 closes a circuit on solenoid winding 45c and bridging of contacts 241 closing a holding circuit for relay winding 235 in shunt to push button 234. Thus the relay is locked in, maintaining solenoid winding 45c energized. When solenoid winding 45c is energized, its plunger brings locking head 45b in engagement with the teeth 45a on rod 45 to lock the rod in a fixed position. Now by moving control lever 38 in an anti-clockwise direction, the regulator may be set for a higher manifold pressure without changing the setting of the propeller governor, spring 45f yielding to permit head 45e to move relatively to casing 45d. Thus a manifold pressure a desired amount higher than that which would normally be used at the given engine speed may be obtained. When an increase in power is called for, the pilot, by pushing forward on control lever 38 can bring collar 242 into engagement with the movable element of circuit closer 239 to open the holding circuit on relay winding 235, to deenergize the relay and permit it to open. This opens the circuit on solenoid winding 45c permitting head 45b to drop from engagement with teeth 45a, thus releasing rod 45 and permitting spring 45f to effect an adjustment of the propeller governor.

In Fig. 1, the arrangement is such that after the propeller governor is locked, the manifold pressure can be only increased relatively to the propeller speed. However, the arrangement may be such that it may be either increased or decreased if desired. An arrangement for accomplishing this is shown in Fig. 4 wherein head 243, corresponding to head 45e in Fig. 1, is arranged between a pair of springs 244 and 245 whereby after the propeller governor is locked for a certain speed, the control lever may be moved in a direction either to increase or decrease the manifold pressure.

In Fig. 5 is shown a modified arrangement for enabling the pilot to adjust the maximum speed of the speed regulator or governor driven from the turbosupercharger, it differing primarily from the arrangement shown in Fig. 1 in that the capacitance of the tuned circuit is varied rather than the inductance. In Fig. 5, the same reference characters with a prime added have been used to designate corresponding parts. The alternating current generator 210' is connected by a conductor 250 to one input terminal of rectifier 214'. The other input terminal is connected by a conductor 251 to two capacitors 252 and 253 arranged in parallel. This terminal is connected also by a conductor 254 to a capacitor 255. Adjacent capacitor 255 is another capacitor 256 which is not in this instance connected in the circuit. In the conductor 254 is a manual switch 257 adapted to be operated by the pilot and a second switch 258 which is opened automatically by pilot's control lever 38' when it reaches a position to a predetermined intake manifold pressure power. In circuit with the four capacitors is an inductance 212' and an adjustable resistance 259, the two being connected in series to the other terminal of generator 210' by a conductor 260. With the connections shown, it will be seen that the three capacitors 252, 253 and 255 are connected into the circuit in parallel and that capacitor 255 is in circuit with the manual control switch 257 and the control lever operated switch 258. The capacitors are of such value that with the three capacitors connected in circuit as shown, the circuit will be tuned for the desired normal maximum turbosupercharger speed. To increase this maximum, the pilot may open the hand switch 257 thus removing the one capacitor from the circuit. Also, this capacitor is removed automatically from the circuit by the opening of switch 258 when the pilot's lever 38' is moved to the position representing a certain predetermined maximum manifold intake pressure. By varying the connections to the several capacitors, the normal maximum speed and what may be termed the emergency maximum speed may be adjusted with respect to each other. By arranging the connections so that more capacitance is removed from the circuit when either switch 257 or switch 258 is opened, a greater increase in speed can be provided for. In use of the device, it may be decided in advance what maximum speeds are desirable and the capacitors adjusted accordingly. By way of example, it may be desirable that the normal maximum speed of the turbosupercharger be 20,000 R. P. M. and that the emergency maximum speed be 24,000 R. P. M., 26,000 R. P. M. or more. By correctly tuning the circuit and adjusting the capacitor connections, the desired speed values can be obtained. The adjustable resistance 259 may be utilized to enable the pilot to adjust the maximum turbosupercharger speed within certain small limits. For example, the change in speed obtainable by adjusting resistance 259 may be of the order of 500 R. P. M. With this arrangement, the resistance arm may be set midway of the resistance. Then, assuming the figure given, the pilot may by means of resistance 259 at any time increase or decrease the maximum obtainable speed of the turbosupercharger by 250 R. P. M. It will be understood that the figures given are only by way of example. The arrangement may be such as to permit the pilot to adjust the speed by means of resistance 259 by the amount deemed desirable for any particular installation. It will be understood that the arrangement shown in Fig. 5 may be used in conjunction with the pilot's hand switch 227 which is utilized to increase the maximum intake manifold pressure.

In accordance with the invention, it will be seen that there is employed only a single control lever for the engine throttle valve, the turbosupercharger waste gate valve and the propeller governor, the single control lever when adjusted effecting the correct adjustment of all three elements to give the most efficient engine operation. This single control lever replaces the three separate control levers used when the engine throttle valve, the turbosupercharger waste gate valve and the propeller governor are adjusted separately and independently. By the invention, the pilot, instead of having to adjust independently three separate control levers, the adjustments being made by the use of separate suitable instruments and charts to properly coordinate the several settings, has simply to set his control lever for the engine power desired, the adjustments of the several elements being then effected automatically. Thus, the burdens of the pilot are reduced materially and more efficient engine operation is assured.

The construction and arrangement for carrying out the invention disclosed and claimed herein has substantial advantage in that it is relatively simple in structure and reliable in operation, and, as already emphasized, provides an arrangement wherein the pilot's control lever is mechanically connected always to the engine throttle valve so that at all times the pilot has direct manual control over the engine throttle valve.

In accordance with the provisions of the patent statutes, we have described the principle of operation of our invention, together with the apparatus which we now consider to represent the best embodiment thereof, but we desire to have it understood that the apparatus shown is only illustrative and the invention may be carried out by other means.

What we claim as new and desire to secure by Letters Patent of the United States, is:

1. In combination, an engine, regulating means for the engine, a control lever connected to the regulating means for positioning it, a control device responsive to a control force which is a measure of an operating condition of the engine connected to the regulating means for positioning it in response to changes in the value of such force, means for adjusting the setting of said control device, and means connecting said adjusting means to said control lever which sets the control device for a value of said control force different from that for which it sets the control device.

2. In combination, an engine, valve means for regulating the engine, a control lever connected to said valve means for positioning it, a control device responsive to a control force which is a measure of the power output of the engine connected to said valve means for positioning it in response to changes in the value of said control force, adjustable means for changing the setting of said control device, and means connecting said adjustable means to said control lever which sets the control device for a control force greater than that for which the valve means is positioned by the control lever.

3. In combination, an engine, valve means which is adjusted to vary the power output of the engine, a control lever for positioning said valve means manually, an electric motor, means connecting the electric motor to said valve means for positioning said valve means, an automatic control device responsive to a control force which is a measure of engine power output for effecting operation of said motor, means connected with said control lever for adjusting the setting of said control device simultaneously with the manual adjusting of said valve means, means biasing said motor connecting means toward a position wherein the valve means is closed, and means for disconnecting the motor from said motor connecting means.

4. In combination, an engine, valve means which is adjusted to vary the power output of the engine, a control lever for positioning said valve means manually, an electric motor for positioning said valve means, an automatic control device responsive to a control force which is a measure of engine power output, a floating lever through which said manual control lever and said motor are connected to said engine valve means for adjusting it, means for adjusting the setting of said automatic control device which is connected to and operated by said control lever, means biasing the floating lever toward a position wherein the valve means is closed, and means for disconnecting the motor from said floating lever.

5. In combination, an engine, a first regulating means which is adjusted to vary the power output of the engine, a second regulating means which is adjusted to vary the power output of the engine, an electric motor for each regulating means for positioning it, an automatic control device responsive to a force which is a measure of engine power output, means for adjusting the setting of said automatic control device, means operated by the motor of the first regulating means for connecting the control device to the motor for the second regulating means, and means operated by the motor for the second regulating means for connecting the control device to the motor for the first regulating means.

6. In combination, an aircraft engine, a regulating means for the engine, a supercharger for the engine, a regulating means for the supercharger, an electric motor for each regulating means, an automatic control device responsive to a force which is a measure of engine power output, means for adjusting the setting of said automatic control device, means operated when the regulating means for the engine reaches a predetermined position through which the electric motor for the supercharger regulating means is connected to said automatic control device, and means operated when the regulating means for the supercharger reaches a predetermined position through which the electric motor for the engine regulating means is connected to said automatic control device.

7. In combination, an engine, a first valve means which is adjusted to vary the power output of the engine, a second valve means which is adjusted to vary the power output of the engine, a motor for each valve means, an automatic control device responsive to a force which is a measure of engine power output, means for adjusting the setting of said automatic control device, and means operated by said motors for connecting said control device to either one or the other of said motors.

8. In combination, an engine, a first valve means which is adjusted to vary the power output of the engine, a second valve means which is adjusted to vary the power output of the engine, a motor for each valve means, manual means for positioning at least one of said valve means, an automatic control device responsive to a force which is a measure of engine power output, means actuated by said manual means for adjusting the setting of said automatic control device, and means connecting said control device to said motors for effecting operation of said two valve means in sequence.

9. In combination, an engine, a first valve means for regulating the power output of the engine, a manual control member connected to said first valve means for positioning it, a second valve means for regulating the power output of the engine, an automatic control device responsive to a force which is a measure of engine power output, means connecting the automatic control device to said first and second valve means to effect their operation in sequence, means connecting the automatic control device to said manual control member for adjusting the setting of the automatic control device, and means whereby when said manual control member is moved to change the setting of said automatic control device at a time when said first valve means is at approximately its extreme position in one direction, there is effected operation of it in the other direction to thereby permit of continued movement of the manual control member.

10. In combination, an engine, a throttle valve for regulating the power output of the engine, a manual control lever connected permanently to the throttle valve for positioning it, a supercharger for the engine, means for regulating the supercharger, an automatic control device responsive to a force which is a measure of engine power output, means connecting said automatic control device to said throttle valve and to said supercharger regulating means to effect their operation in sequence, said supercharger regulating means being operated after said throttle valve is at least substantially fully open, means connecting the automatic control device to said manual control lever whereby movement of the manual control lever serves to set the automatic control device, and means whereby movement of said control lever to effect final complete opening of the throttle valve effects movement of the throttle valve toward closed position whereby the control lever may be moved to set the automatic control device when the throttle valve reaches the end of its opening movement.

11. In combination, an engine, a first valve means for regulating its power output, a floating lever connected to the first valve means, a manual control member connected to the floating lever for adjusting said first valve means, a second valve means for regulating the power output of the engine, an automatic control device responsive to a force which is a measure of engine power output, means connecting the automatic control device to said floating lever and to said second valve means for operating them in sequence, means connecting the automatic control device to said manual control member for adjusting the setting of the automatic control device, and means whereby continued movement of said manual control member to adjust the setting of said automatic control device may be effected after said first named valve means reaches an extreme regulating position.

12. In combination, an engine, a first valve means for regulating its power output, a floating lever connected to the first valve means, a manual control member connected to the floating lever for adjusting said first valve means, a second valve means for regulating the power output of the engine, an automatic control device responsive to a force which is a measure of engine power output, means connecting the automatic control device to said floating lever and to said second valve means for operating them in sequence, means connecting the automatic control device to said manual control member for adjusting the setting of the automatic control device, and means whereby continued movement of said manual control member to adjust the setting of said automatic control device after said first valve means has reached an extreme position tends to move said first valve means in a direction away from such extreme position.

13. In combination, an engine, a throttle valve for regulating the power output, a floating lever connected to the throttle valve, a manual control member connected to the floating lever for adjusting the throttle valve, an electric motor connected to the floating lever for adjusting the throttle valve, a supercharger for the engine, regulating means for the supercharger, an electric motor for adjusting the supercharger regulating means, an automatic control device responsive to a force which is a measure of engine power output, means connecting the automatic control device to said electric motors to effect adjustments of said throttle valve and said supercharger regulating means in sequence, means connecting said automatic control device to said manual control member for adjusting the setting of the automatic control device, and means whereby continued movement of said manual control member to adjust the setting of said automatic control device after said throttle valve has reached an extreme open position effects operation of said first named electric motor in a direction tending to close the throttle valve.

14. In combination, an engine, a throttle valve for regulating its power output, a floating lever connected to the throttle valve, a manual control member connected to the floating lever for adjusting the throttle valve, an electric motor connected to the floating lever for adjusting the throttle valve, a turbosupercharger for the engine, regulating means for the turbosupercharger, an automatic control device responsive to a force which is a measure of engine power output, means connecting said automatic control device to said electric motor and to said turbosupercharger regulating means to effect adjustment of the throttle valve and turbosupercharger regulating means in sequence, means connecting said automatic control device to said manual control member for adjusting the setting of the automatic control device, and means whereby continued movement of said manual control member to adjust the setting of said automatic control device after said throttle valve has reached an extreme open position effects operation of said electric motor in a direction tending to close the throttle valve.

15. In combination, an engine, a throttle valve for regulating its power output, a floating lever connected to the throttle valve, a manual control member connected to the floating lever for adjusting the throttle valve, an electric motor connected to the floating lever for adjusting the throttle valve, a turbosupercharger for the engine, regulating means for the turbosupercharger, an automatic control device responsive to a force which is a measure of engine power output, means connecting said automatic control device to said electric motor, means including a follow-up mechanism connecting said automatic control device to said turbosupercharger regulating means, means connecting said automatic control device to said manual control member for adjusting the setting of the automatic control device, and means controlled by the positions of said throttle valve and said turbosupercharger regulating means for transferring connections of the automatic control from the throttle valve to the turbosupercharger regulating means.

16. In combination, an engine, a throttle valve for the engine, an electric motor for positioning the throttle valve, a turbosupercharger for the engine, a regulating valve for the turbosupercharger, an electric motor for positioning said regulating valve, an automatic control device responsive to a force which is a measure of engine power output, and means including transfer switches actuated by said motors for effecting connection of said automatic control device to the respective motors for actuating said throttle valve and said regulating valve in sequence.

17. In combination, an engine, a plurality of regulating means for the engine, an electric motor for each regulating means for positioning it, an automatic control device responsive to a force which is a measure of engine power output, and means for electrically connecting said control device to said motors in sequence to effect sequential operation of said regulating means.

18. In combination, an engine, a plurality of regulating means for the engine, an electric motor for each regulating means for positioning it, an automatic control device, and electric circuits including transfer switches controlled in accordance with the positions of said regulating means, for connecting said automatic control device to said electric motors in sequence.

19. In combination, an aircraft engine, a valve regulating admission of fuel to the engine, a supercharger, a regulating valve for the supercharger, a reversing electric motor for positioning each regulating valve, an automatic control device responsive to a force which is a measure of engine power output, and electric circuits including a limit switch and a transfer switch for each motor for connecting the control device to the regulating valves sequentially.

20. In combination, an engine, valve means, a motor which positions the valve means to vary the power output of the engine, an automatic control device responsive to a force which is a measure of engine power output, means connecting the automatic control device to said motor including a speed governor operated by the motor for rendering said connecting means ineffective when the motor speed reaches a predetermined value, and means controlled by movement of said valve means for rendering ineffective said speed governor.

21. In combination, an engine, valve means, an electric motor which positions the valve means to vary the power output of the engine, control contact means actuated by a force which is a measure of engine power output, electric circuits connecting the control contact means to said motor, a device responsive to the speed of said electric motor for rendering said electric circuits ineffective when the motor speed reaches a predetermined value, and means actuated by movement of said valve means for rendering said speed responsive device ineffective.

22. In combination, an engine, valve means, an electric motor which positions the valve means to vary the power output of the engine, control contact means actuated by a force which is a measure of engine power output, electric circuits connecting the control contact means to said motor, a device responsive to the speed of said electric motor for opening said electric circuits when the motor speed reaches a predetermined value, and a circuit closer for closing a circuit in shunt to said speed responsive device to render it ineffective to open said circuits after a predetermined movement of said valve means.

23. In combination, an engine, valve means, manually operated means connected to said valve means for positioning it, a motor connected to said valve means for positioning it, an automatic control device responsive to a force which is a measure of engine power output, means connecting said control device to said motor including means responsive to motor speed for rendering said connecting means ineffective when the motor speed reaches a predetermined value, and means actuated by movement of said valve means by either said manually operated means or said motor for rendering ineffective said motor speed responsive means.

24. In combination, an engine, valve means controlling the power output of the engine, a shaft connected to the valve means, a floating lever, means connecting it to said shaft, a manual control means and an electric motor each connected to the floating lever for moving it to position said valve means, an automataic control device responsive to a force which is a measure of engine power output, electric circuits connecting the automatic control device to said motor, motor speed operated contact means in said electric circuits for disrupting said electric circuits when the motor speed reaches a predetermined value, and contact means actuated by movement of said shaft for rendering said motor speed operated contact means ineffective.

25. In combination, an engine, valve means controlling the power output of the engine, a shaft connected to the valve means, a floating lever, means connecting it to said shaft, a manual control means and an electric motor each connected to the floating lever for moving it to position said valve means, an automatic control device responsive to a force which is a measure of engine power output, electric circuits connecting the automatic control device to said motor, motor speed operated contact means in said electric circuits for disrupting said electric circuits when the motor speed reaches a predetermined value, contact means actuated by movement of said shaft for rendering said motor speed operated contact means ineffective, and means connected to the manual control means for adjusting the setting of said automatic control device.

26. In combination, an engine, a turbosupercharger for the engine, valve means for regulating the speed of the turbosupercharger, an automatic control device responsive to a control force which is a measure of engine power output connected to said valve means for positioning it in response to changes in the value of said control force, means for adjusting the setting of said automatic control device, means for limiting an extreme value of said control force, means for limiting the speed of the turbosupercharger, and means operable from a distance for changing the values of the limits held by said two limiting means.

27. In combination, an engine, valve means for regulating the engine, a manually operated lever connected to said valve means, a supercharger for the engine, speed regulating means for the supercharger, an automatic control device responsive to a force which is a measure of engine power output, means connected with said manually operated lever for adjusting the setting of said automatic control device, and means whereby said automatic control device may be connected to control either the supercharger regulating means alone or both the supercharger regulating means and said valve means.

28. In combination, an engine, valve means for regulating the engine, a manually operated lever connected to said valve means, a supercharger for the engine, speed regulating means for the supercharger, an automatic control device responsive to a force which is a measure of engine power output, means connected with said manually operated lever for adjusting the setting of said automatic control device, means connecting said automatic control device to said valve means and to said supercharger speed regulating means for operating them in sequence, and means for disconnecting said valve means from said automatic control device.

29. In combination, an engine, valve means which is adapted to vary the power output of the engine, a control lever for positioning said valve means manually, an electric motor, means including an electrically operated clutch for connecting the motor to the valve means, a supercharger for the engine, a control valve for the supercharger, an electric motor, means including an electrically operated clutch for connecting it to the supercharger control valve, an automatic control device which is responsive to a control force which is a measure of engine power output, electric circuit means between the control device and said electric motors, and switch means which closes said circuit means and effects operation of said clutches to connect the motors to said valve means.

30. In combination, an engine, valve means which is adjusted to vary the power output of the engine, a control lever for positioning said valve means manually, an electric motor, means including an electrically operated clutch for connecting the motor to the valve means, a supercharger for the engine, a control valve for the supercharger, an electric motor, means including an electrically operated clutch for connecting it to the supercharger control valve, an automatic control device which is responsive to a control force which is a measure of engine power output, electric circuit means between the control device and said electric motors, switch means which closes said circuit means and effects operation of said clutches to connect the motors to said valve means, and means biasing said valve means toward predetermined positions.

31. In combination, an aircraft engine, a propeller driven by the engine, a propeller governor, engine fuel control means, manual means for adjusting simultaneously the propeller governor and the fuel control means, magnetically operated means including an electric circuit closer for locking the propeller governor in a set position, and means actuated by movement of said manual means for actuating said circuit closer to effect release of said propeller governor.

32. A control system for aircraft having an engine, a propeller driven by said engine, a propeller governor for governing the speed of the engine and a throttle valve for controlling the power output of the engine, said system comprising a manually operated control device, a first linkage interconnecting said control device and said governor and a second linkage interconnecting said control device and said throttle valve whereby the setting of the governor and throttle valve may be adjusted simultaneously by actuation of said control device, a yielding connection interposed in said first linkage and means for locking said governor whereby said throttle valve may be adjusted independently by said control device after the governor is locked.

33. Apparatus for controlling the pressure of the air supplied to the intake manifold of an internal combustion engine having a throttle, a compressor for supplying air to said intake manifold through said throttle, and means for controlling the compression ratio of said compressor, comprising in combination, first electrical motor means for operating said throttle, second electrical motor means for operating said ratio controlling means, an electrical control device responsive to the pressure in said intake manifold, means including said control device for controlling said first motor means, and current flow controlling means operated as an incident to movement of said throttle to its open position to place said second motor means under control of said device.

CHARLES H. RIDGLEY.
HERBERT H. ANDERSEN.
FRANCIS W. TRUESDELL.

REFERENCES CITED

The following references are of record in the file of this patent:

UNITED STATES PATENTS

| Number | Name | Date |
|---|---|---|
| 1,557,793 | Berger et al. | Oct. 20, 1925 |
| 1,887,146 | Conkling | Nov. 8, 1932 |
| 1,951,927 | Dodson | Mar. 20, 1934 |
| 1,995,800 | Dodson | Mar. 26, 1935 |
| 2,079,958 | Dodson | May 11, 1937 |
| 2,168,958 | Lichtenstein | Aug. 8, 1939 |
| 2,205,354 | Gregg et al. | June 18, 1940 |
| 2,217,364 | Halford | Oct. 8, 1940 |
| 2,228,239 | Ammann | Aug. 14, 1941 |
| 2,279,615 | Bugatti | Apr. 14, 1942 |
| 2,285,344 | Marples et al. | June 2, 1942 |
| 2,297,235 | Muller | Sept. 29, 1942 |
| 2,305,810 | Muller | Dec. 22, 1942 |
| 2,306,277 | Oswald | Dec. 22, 1942 |
| 2,311,642 | Crane et al. | Feb. 23, 1943 |
| 2,346,916 | Halford et al. | Apr. 18, 1944 |
| 2,358,363 | Truesdell | Sept. 19, 1944 |
| 2,368,501 | Thompson | Jan. 30, 1945 |
| 2,384,353 | Stieglitz | Sept. 4, 1945 |
| 2,386,288 | Blaylock | Oct. 9, 1945 |

OTHER REFERENCES

Ser. No. 363,192, Lorenzen (A. P. C.) pub. May 18, 1943.

Disclaimer 2,476,063.—*Charles H. Ridgley*, Marblehead, and *Herbert H. Andersen*, Beverly, Mass., and *Francis W. Truesdell*, Schenectady, N. Y. CONTROL FOR SUPERCHARGED INTERNAL-COMBUSTION ENGINES. Patent dated July 12, 1949. Disclaimer filed Nov. 14, 1952, by the assignee, *General Electric Company*.

Hereby enters this disclaimer to claims 1 and 2 of said patent.

[*Official Gazette December 16, 1952.*]